United States Patent [19]

Fairchok et al.

[11] 4,331,787

[45] May 25, 1982

[54] CONTINUOUS POLYMERIZATION OF WATER-MISCIBLE MONOMERS

[75] Inventors: William J. Fairchok; Frederick W. Stanley, Jr., both of Midland, Mich.

[73] Assignee: The Dow Chemical Company, Midland, Mich.

[21] Appl. No.: 174,295

[22] Filed: Jul. 31, 1980

[51] Int. Cl.³ .............................................. C08F 2/32
[52] U.S. Cl. .................................... 523/324; 526/64; 526/74; 526/62; 524/555
[58] Field of Search .................... 526/62, 64, 74, 88; 260/29.6 WQ

[56] References Cited

U.S. PATENT DOCUMENTS

| | | | |
|---|---|---|---|
| 3,951,600 | 4/1976 | Asano | 526/62 |
| 3,996,180 | 12/1976 | Kane | 260/29.6 WQ |
| 3,996,411 | 12/1976 | Ohshima | 526/62 |
| 4,007,320 | 2/1977 | Peterson | 526/74 |
| 4,098,977 | 7/1978 | Zweigle | 526/62 |
| 4,117,216 | 9/1978 | Witenhafer | 526/74 |
| 4,146,690 | 3/1979 | Tago | 526/62 |
| 4,212,784 | 7/1980 | Phillips | 260/29.6 WQ |

Primary Examiner—Paul R. Michl

[57] ABSTRACT

Water-miscible monomers such as acrylamide are polymerized continuously to produce a concentrated solution of a high molecular weight polymer by passing a mixture of a water-immiscible organic liquid and an aqueous solution of at least 20 weight percent of the monomer through a tubular reactor, e.g., a polyethylene tube, having internal surfaces that are readily wetted by the hydrocarbon liquid and polymerizing the monomer in the reactor. The polymerized product is recovered as a water-in-oil emulsion wherein the polymer resides in the dispersed aqueous phase or as a solid strand which is a high solids aqueous solution containing at least 20 weight percent of the water-soluble polymer of the water-miscible monomer.

5 Claims, No Drawings

CONTINUOUS POLYMERIZATION OF WATER-MISCIBLE MONOMERS

BACKGROUND OF THE INVENTION

This invention relates to the polymerization of water-miscible monomers in aqueous solution.

Most water-soluble polymers, particularly polymers of acrylamide, acrylic acid and their water-miscible derivatives have been employed commercially as additives in the manufacture of paper products, as water purification coagulants, as dispersing agents and as treating agents in a wide variety of other applications.

Of the various methods employed to polymerize water-miscible monomers, the aqueous solution polymerization method is the most commonly employed because it is less expensive and it readily provides water-soluble polymers having the high molecular weight that is essential for many applications. In such a method, the concentrations of monomer and resulting polymer in aqueous solution are maintained as high as possible in order to maximize the capacity of the polymerization apparatus and to minimize the amount of water that is subsequently removed from the resulting polymer product. Unfortunately, however, concentrated aqueous solutions, i.e., those in excess of 2 to 3 weight percent of the resulting water-soluble polymer, are extremely viscous. Thus, in highly concentrated solutions of the water-soluble polymer, it is virtually impossible to provide adequate heat transfer by stirring so that a uniform polymerization temperature is maintained throughout the polymerization vessel. In addition, it is difficult to remove the viscous polymer solution from the vessel once polymerization is complete.

To solve the aforementioned problems resulting from the high viscosities of relatively dilute aqueous solutions of such water-soluble polymers, it has been a practice to suspend or emulsify the aqueous solution of water-miscible monomer in a water-immiscible organic liquid such as a liquid hydrocarbon; then, the monomer in suspension or emulsion is polymerized to form a relatively unstable suspension or a relatively stable emulsion of the desired water-soluble polymer. Methods of practicing such suspension or emulsion polymerization are described in U.S. Pat. Nos. 2,982,749 and 3,284,393, respectively. In following the aforementioned suspension or emulsion polymerization methods, the concentration of monomer, and resulting polymer, in the suspension or emulsion may be increased to about 30–40 weight percent based on the weight of the suspension or emulsion. In order to achieve greater reduction in the quantity of water to be removed as well as to reduce the quantity of expensive hydrocarbon liquid, it has been desirable to further increase concentration of the monomer and resulting polymer in the suspension or emulsion. Unfortunately, attempts to increase the concentration of monomer, and resulting polymer, significantly above the 30–40 weight percent level normally used have generally been unsuccessful due to premature coagulation of the dispersed polymer and/or loss of desired polymer properties. For example, it is often very difficult to produce highly concentrated emulsions or suspensions of the polymer wherein the polymer has a relatively high molecular weight but no insolubles (gels). Also, it has often been difficult to practice such methods in a continuous manner.

In view of the aforementioned deficiencies of the prior art methods, it is highly desirable to provide a continuous process for polymerizing water-miscible monomers in relatively concentrated aqueous solutions to form water-soluble polymers that have uniformly high molecular weight and are relatively free of water-insoluble gels.

SUMMARY OF THE INVENTION

The present invention is such a process which comprises (1) passing a mixture of a water-immiscible, organic liquid lubricant (hereinafter called organic liquid) and an aqueous solution containing at least about 20 weight percent of a water-miscible monomer (hereinafter this solution is called aqueous phase) through a reactor having (a) a cross-section sufficiently narrow to effect suitable heat transfer from the mixture and (b) internal surfaces which are not wetted by the aqueous phase and (2) subjecting said mixture to conditions sufficient to polymerize the monomer in the reactor thereby forming the desired water-soluble polymer which is maintained separate from the internal surfaces of the reactor by the organic liquid.

Surprisingly, by the practice of the present invention, the polymer can be recovered from the reactor in concentrations which are as high as the solubility of the monomer in the aqueous phase permits. In the case of acrylamide, such concentrations can be as high as 60, preferably from about 45 to 55, weight percent based on the weight of aqueous phase. Also, this process can be carried out in a continuous manner to produce a polymer which is high in molecular weight yet contains no more water-insoluble gels than do polymerization products of dilute aqueous solution polymerization methods or conventional emulsion polymerization methods such as reported in U.S. Pat. No. 3,284,393.

The polymers prepared in accordance with the practice of this invention are useful in the same applications as similar water-soluble polymers prepared by conventional polymerization methods. Examples of such applications include additives for the manufacture of paper, agents for the treatment of sewage and industrial waste waters, thickeners, dispersing agents and trial waste waters, thickeners, dispersing agents and the like.

DETAILED DESCRIPTION OF THE REPRESENTATIVE EMBODIMENTS

Water-miscible monomers suitably employed in the practice of this invention are those ethylenically unsaturated monomers which are sufficiently water-miscible to form a single aqueous phase when 5 weight parts of the monomer are dispersed in water. Such monomers readily undergo addition polymerization to form polymers which are at least inherently water-dispersible and preferably water-soluble. By "inherently water-dispersible" it is meant that the polymer when contacted with an aqueous medium, will disperse therein without the aid of surfactants to form a colloidal dispersion of the polymer in the aqueous medium. Preferably, such polymers are sufficiently water-soluble that they will form at least a 5 weight percent solution when dissolved in water. Exemplary water-miscible monomers include the water-miscible ethylenically unsaturated amides such as acrylamide, methacrylamide and fumaramide; water-miscible N-substituted ethylenically unsaturated amides such as N-(N',N'-dialkylaminoalkyl)acrylamide, e.g., N-(N',N'-dimethylaminomethyl)acrylamide and quaternized derivatives thereof such as N-(N',N',N'-trimethylammonium methyl)acrylamide chloride and N-substituted alkylol acrylamide such as N-methylol acrylamide; ethylenically unsaturated carboxylic acids such as acrylic acid, methacrylic acid, fumaric acid and the like; ethylenically unsaturated quaternary ammonium compounds such as vinylbenzyl trimethylammonium chloride; sulfoalkyl esters of carboxylic acids such as 2-sulfoalkyl methacrylate as well as the alkali metal and ammonium salts thereof; aminoalkyl esters and quaternary ammonium alkyl of unsaturated carboxylic acids such as 2-aminoethyl methacrylate and 2-(N,N,N-trimethylammonium)ethyl methacrylate chloride; vinyl aryl sulfonates such as vinylbenzene sulfonate as well as the alkali metal and ammonium salts thereof; diallyl quaternary ammonium compounds such as dimethyl diallyl ammonium chloride and diethyl diallyl ammonium chloride; N-(sulfoalkyl)acrylamides and methacrylamides such as N-(2-sulfo-1,1-dimethylethyl)acrylamide; ethylenically unsaturated amines such as allyl and diallylamine and the like. Of the foregoing water-miscible monomers, acrylamide and the water-miscible derivatives of acrylamide as well as acrylic acid and methacrylic acid and mixtures of such monomers are preferred. Especially preferred are acrylamide and mixtures of acrylamide and acrylic acid containing from about 10 to about 30 weight percent of acrylic acid.

The water-immiscible organic liquid employed in the practice of this invention is suitably any inert hydrophobic liquid which does not take part in the polymerization reaction and which is sufficiently water-immiscible that it can be readily separated, e.g., by filtration or decantation, from the polymeric product. Such a water-immiscible liquid acts as a lubricant as the monomer in the aqueous phase is polymerized and passed through the reactor. An organic liquid is a suitable lubricant if the amount of energy required to pump a given amount of the aqueous phase through the reactor is reduced by the presence of the organic liquid. Of such liquids, the hydrocarbons and chlorinated hydrocarbons such as toluene, xylene, benzene, ortho-dichlorobenzene, ethylbenzene, liquid paraffins having from 8 to 12 carbons, monochlorobenzene, propylene dichloride, perchloroethylene, carbon tetrachloride, tetrachloroethylene, methylene chloride and the like are preferred. The liquid paraffins, toluene and xylene are especially preferred.

The mixture of the water-immiscible organic liquid and aqueous phase contains sufficient organic liquid to act as a lubricant between the aqueous phase and the internal surfaces of the reactor and to separate such surfaces from the aqueous phase as the mixture passes through the reactor. The proportion of the aqueous phase in the mixture is sufficient to maximize the capacity of the reactor to produce the desired polymer without plugging the reactor, i.e., increase flow of the aqueous phase through the reactor. Preferably, the weight ratio of aqueous phase to organic liquid in the mixture is from about 20:1 to about 0.25:1, more preferably from about 6:1 to about 2:1 and most preferably from about 5:1 to about 3:1. In the aqueous phase, there is sufficient water to facilitate the aqueous solution polymerization of the monomer and there is sufficient monomer to produce economical quantities of polymer. Preferably, the concentration of monomer in the aqueous phase is from about 20 to about 95 weight percent, more preferably from about 30 to about 55 weight percent and most preferably from about 40 to about 50 weight percent.

The particular physical form of the mixture is not critical, for example, the mixture may exist in the form of an emulsion as described in U.S. Pat. No. 3,284,393; a suspension as described in U.S. Pat. No. 2,982,749 and a generally unstable mixture which will separate into mutual exclusive phases if no shearing agitation is applied to the mixture.

In the instances wherein the mixture is in the form of a water-in-oil emulsion, the aqueous phase is dispersed in the organic liquid which contains a sufficient amount of a water-in-oil emulsifier to provide a stable emulsion. Examples of such water-in-oil emulsifiers are those generally having a hydrophobic-lipophobic balance in the range from about 2 to about 9, most preferably from about 3 to about 6. Such emulsifying agents are specifically exemplified in U.S. Pat. Nos. 3,284,393; 3,624,019 and 3,374,873; which also describe the ratios of oil to aqueous phase and concentrations of emulsifiers usefully employed. For the purposes of this invention, the emulsifying agent is preferably an amide reaction product of oleic acid with isopropanolamide with other agents such as hexadecyl sodium phthalate, cetyl sodium phthalate, octadecyl sodium phthalate, sorbitan monooleate, sorbitan stearate, glycerin mono- or distearate and combinations of such agents also being suitable. Also, for the purposes of this invention, the emsulfier is advantageously employed in an amount sufficient to provide the water-in-oil emulsion, which amount is commonly within the range from about 0.1 to about 20, preferably from about 1.5 to about 3, weight percent based on the weight of the aqueous phase.

In the instances wherein the mixture is in the form of a suspension, suspending agents such as silanized silica, ethylcellulose and the like are employed to stablize the suspension. Further description of suitable suspending agents, concentration of such agents as well as proportions of aqueous phase to organic phase, concentrations of monomer within the aqueous phase and methods for preparing such suspensions are set forth in detail in U.S. Pat. No. 2,982,749.

Finally, in instances wherein an unstable mixture of aqueous phase and organic liquid is employed, the aqueous phase and organic liquid are combined by mixing the two components to form a relatively unstable mixture or by merely combining the two components in a conduit leading into the reactor. In the latter instance, it should be understood that uniform dispersion of the aqueous phase in the oil phase is not critical. So long as the organic liquid is present in the reactor in sufficient quantity to maintain such internal surfaces separate from the aqueous phase, the degree of dispersion of aqueous solution in monomer is not critical. In fact, it is possible to introduce such mixture into the reactor such that the organic liquid and aqueous phase are two mutually exclusive phases, e.g., wherein the organic liquid forms a coating around a strand or stream of aqueous phase. Preferably, the weight ratio of the organic liquid to aqueous phase is in the range from about 0.05:1 to about 10:1, most preferably from about 0.15:1 to about 2:1. In such instances, it is not necessary to employ either suspending agent or emulsifier. In this latter instance, the concentration of monomer in the aqueous phase is preferably in the range from about 20 to about 75 weight percent, most preferably from about 40 to about 50 weight percent.

In order to effect polymerization of the monomer(s) in the reactor, it is generally advantageous to include the polymerization initiator as commonly employed in addition polymerization of ethylenically unsaturated monomers, which those used in either suspension or emulsion polymerization methods as described in U.S. Pat. Nos. 2,982,749 and 3,284,393 being preferred. Examples of such initiators include peroxygen catalysts such as t-butyl hydroperoxide, dimethane sulfonyl peroxide and redox systems such as t-butyl hydroperoxide or alkali metal or ammonium persulfates in combination with usual reducing agents such as sodium sulfite or sodium bisulfite. When such initiators are employed, they are generally employed in concentrations from about 0.0001 to about 0.02, preferably from about 0.00025 to about 0.001, weight percent of the initiator based on the weight of the monomer(s). Alternatively, any free-radical generating means can be suitably employed, for example, those generated in situ by ultraviolet light or X-rays, as well as thermal means and the like.

The reactor employed in the polymerization of the monomer in the practice of this invention is a reactor having a narrow cross-section such that effective heat transfer is maintained as a result of passing the mixture through the reactor without additional internal agitation. Accordingly, the particular dimension of the reactor cross-section will vary with the heat of reaction, concentration of monomer in the aqueous phase as well as the particular organic liquid and ratio of organic liquid to aqueous phase being employed. Preferably, however, the cross-section of the reactor will have a minimum dimension of at least 1 mm and a maximum dimension of no greater than 1500 mm, preferably from about 10 mm to about 200 mm. It is understood that the reactor may be in the shape of a tube which is coiled or linear. Also, the cross-section of the tube may be circular or compressed to form a planar shape. Alternatively, the reactor may have an annular configuration such as disclosed in U.S. Pat. No. 2,932,756 or may comprise a plurality of separate tubes. Accordingly, it is understood that the shape or configuration of the reactor is not particularly critical so long as reasonable heat transfer can be maintained and the mixture can pass through the reactor at a reasonable rate.

It is critical, however, that the internal surfaces of the reactor, i.e., those which come in contact with the mixture, be composed of materials which are not wetted by the aqueous solution of polymer (aqueous phase). For the purpose of this invention, the term "not wetted by" shall mean that when a drop of the aqueous phase is applied to the internal surface of the reactor lying in the horizontal plane, the contact angle of said drop of aqueous phase shall be greater than 90°, preferably greater than 100°, under the conditions of temperature and the like to be employed in the polymerization process. A suitable method for measuring contact angle is described in *Contact Angle, Wettability and Adhesion*, published by the American Chemical Society, Chap. 19 (1964). Exemplary materials suitable as internal surfaces of the reactor include polyethylene, polypropylene and other polymers of aliphatic monoolefins; polytetrafluoroethylene and other polymers of fluorinated olefins, and other materials which are not wetted by the aqueous phase.

The length of the reaction time is not particularly critical so long as the mixture remains in the reactor for a time sufficient to polymerize essentially all monomer. Normally, residence times range from about 0.25 to about 3, preferably from about 0.25 to about 0.75, hours. Accordingly, the length and diameter (volume) of the reactor are sufficient to attain the aforementioned residence times.

The temperatures employed in the practice of this invention are not particularly critical and are generally those conventionally employed in polymerizing such water-miscible monomers. Preferably, such temperatures range from about 10° to about 100° C., most preferably from about 25° to about 35° C. In most instances, particularly those wherein the mixture is employed in the form of a water-in-oil emulsion as described hereinbefore, it is desirable to polymerize the monomer in two stages, an initial stage wherein the monomer is subjected to temperatures less than 70° C., preferably from about 25° to about 35° C. and a second stage wherein the mixture is subjected to temperatures in excess of 70° C., preferably from about 75° to about 100° C. In order to practice this two-stage procedure, it is desirable to pass the mixture through two reactors, an initial reactor operating at a temperature below 70° C. and subsequent reactor operating at a temperature in excess of 70° C. It is found that the employment of this two-stage polymerization procedure when the mixture is an emulsion prevents or reduces destabilization of the emulsion and improves physical properties of the polymer. Clearly, if it is desired to recover the polymer in the form other than an emulsion, such can be achieved by passing the emulsion through a one-stage reactor at temperatures above 70° C. with the result being the polymer product in a form other than an emulsion.

Recovery of the polymer from the reactor is readily achieved since the mixture of organic liquid and aqueous phase containing the resulting polymer flows readily through the reactor. Thus, the polymer can be employed as is if it is recovered in the form of the suspension or emulsion or can be recovered as a solid by coagulating and/or decanting the emulsion, destabilizing the emulsion or chopping or otherwise slicing the polymer if produced in a solid form. If the polymer is to be stored as the powder or similar finely divided particulate, it is advantageous to subject it to air drying to prevent subsequent agglomeration of the particulate. Accordingly, recovery of the polymer is generally achieved according to conventional techniques.

The following examples are given to illustrate preferred embodiments of the invention and should not be construed as limiting its scope. Unless otherwise indicated, all parts and percentages are by weight.

EXAMPLE 1

An aqueous solution or water-miscible monomer is prepared by combining the following ingredients: 252 g of a 49.9 percent solution of acrylamide in water, 53.86 g of acrylic acid, 3.9 g of a 10 percent solution of the pentasodium salt of (carboxymethylimino)bis(ethylenenitrilo)tetraacetic acid and enough water and 50 percent sodium hydroxide to provide 700 g of total solution and adjust the solution to a pH of 6. A milliliter of a 19.4 weight percent solution of sodium persulfate in water is added to the foregoing aqueous solution. An organic liquid is prepared by combining the following ingredients: 162 g of Isopar ® M ($C_8$–$C_9$) aliphatic hydrocarbon, 5.9 g of the isopropanolamide of oleic acid and 3.9 g of sorbitan monooleate. The aqueous solution and organic liquid are then added to a Waring blender and homogenized to form the desired water-in-oil emulsion. The emulsion is placed in a 2 liter feed tank and pumped through a nitrogen purged zone to remove oxygen from the emulsion. The purged emulsion is then pumped through a conduit to two reactors connected in a series wherein the first reactor is maintained at a temperature of 60° C. and the second reactor is maintained at a temperature of 70° C. Each reactor consists of polyethylene tubing having an outside diameter of 0.635 cm and an inside diameter of 0.318 cm. All conduits from the feed tank to the polymer recovery vessel in this example are made of similar polyethylene tubing. Each reactor is 6.1 meters in length and is coiled such that the inside diameter of each coil is approximately 20 cm. The flow rate of the mixture through the reactors is approximately 3 cc per minute with nitrogen being added to the nitrogen purge zone having a volume of 100 cc at a rate of approximately 10 cc per minute. Residence time of the mixture in each reactor is approximately 20 minutes. The water-in-oil emulsion of the resulting acrylamide/acrylic acid copolymer has a Ostwald viscosity (0.5 percent solution in 3 percent NaCl, pH=7 and 25° C.) of 16.5 cps. The resulting polymer product contains less than 0.5 weight percent of insolubles (gels) based on the monomer added to the reactors. The foregoing continuous process reduces cycle time normally employed in a batch reactor from 3 hours to 40 minutes. The recovered emulsion contains approximately 29 weight percent of the desired polymer, based on the weight of the emulsion.

EXAMPLE 2

An aqueous solution of monomer is prepared by combining the following ingredients: 100 g of a 50 percent solution of acrylamide and water, 0.2 g of a pentasodium salt of (carboxymethylimino)bis(ethylenenitrilo)-tetraacetic acid and 0.05 g of sodium persulfate. This aqueous solution is charged to a 235 ml jar and purged with the nitrogen to remove oxygen. To another 235 ml jar is added 100 g of Isopar ® M and purged with nitrogen. The aqueous solution and the Isopar ® M are pumped from their respective containers at the rate of 2 cc per minute through a polyethylene tubing conduit having an outside diameter of 0.635 cm and an inside diameter of 0.318 cm to a coiled reactor made of the same polyethylene tubing wherein each coil has an average inside diameter of 20 cm. The reactor has a length of approximately 7.5 m and is immersed in a water bath maintained at a temperature of 70° C. Residence time of the combined aqueous solution and Isopar ® M in the reactor is approximately 15 minutes.

The polymer product is recovered as a strand of solid aqueous solution (40 percent polyacrylamide) of the polymer coated with the Isopar ® M, the Isopar ® M is decanted from the polymer and the polymer is air dried at 120° C. overnight. The solid polymer is then ground and redispersed in water. This polymer product has less than 0.2 percent gels or insolubles and an Ostwald viscosity (using same conditions as in Example 1) of ~20 cps.

What is claimed is:

1. A process for polymerizing a water-miscible monomer comprising the steps of (1) passing a mixture of a water-immiscible, organic liquid lubricant and an aqueous phase containing at least about 20 weight percent of the water-miscible monomer through a reactor having (a) a cross-section sufficiently narrow to effect suitable heat transfer from the mixture and (b) internal surfaces which are not wetted by the aqueous solution and (2) subjecting said mixture to conditions sufficient to polymerize the monomer in the reactor thereby forming a water-soluble polymer of the monomer which polymer remains in the aqueous phase and is maintained separate from the internal surfaces of the reactor by the organic liquid, the ratio of the lubricant to aqueous phase is sufficient to increase flow of the aqueous phase through the reactor.

2. The process of claim 1 wherein the monomer is acrylamide or a mixture of acrylamide and acrylic acid, the lubricant is a liquid hydrocarbon or halohydrocarbon, the internal surfaces of the reactor consist essentially of polyethylene, and the cross-section of the reactor has a diameter in the range from about 1 to about 1500 mm.

3. The process of claim 2 wherein the weight ratio of aqueous phase to lubricant is from about 20:1 to about 0.25:1 and the concentration of acrylamide in the aqueous phase is from about 45 to about 55 weight percent.

4. The process of claim 1, 2 or 3 wherein the mixture is in the form of a water-in-oil emulsion.

5. The process of claim 2 or 3 wherein the reactor has the shape of a tube and the cross-section of the reactor has a diameter in the range from about 10 to about 200 mm.

* * * * *